US010432733B2

United States Patent
Quinlan et al.

(10) Patent No.: US 10,432,733 B2
(45) Date of Patent: Oct. 1, 2019

(54) DEVICES AND METHODS FOR MANAGING A NETWORK COMMUNICATION CHANNEL BETWEEN AN ELECTRONIC DEVICE AND AN ENTERPRISE ENTITY

(71) Applicant: BlackBerry Limited, Waterloo (CA)

(72) Inventors: Sean Michael Quinlan, Duvall, WA (US); Haniff Somani, Mercer Island, WA (US); Sanjiv Maurya, Fremont, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 211 days.

(21) Appl. No.: 15/448,668

(22) Filed: Mar. 3, 2017

(65) Prior Publication Data

US 2018/0255143 A1 Sep. 6, 2018

(51) Int. Cl.
*G06F 15/16* (2006.01)
*H04L 29/08* (2006.01)
*H04L 12/26* (2006.01)

(52) U.S. Cl.
CPC ........ *H04L 67/141* (2013.01); *H04L 43/0864* (2013.01); *H04L 67/32* (2013.01)

(58) Field of Classification Search
CPC .... H04L 67/141; H04L 67/32; H04L 43/0864
See application file for complete search history.

(56) References Cited

U.S. PATENT DOCUMENTS

| | | | |
|---|---|---|---|
| 6,115,752 A | 9/2000 | Chauhan | |
| 7,086,061 B1* | 8/2006 | Joshi | H04L 29/12066 718/105 |
| 9,444,903 B2 | 9/2016 | Nuaimi et al. | |
| 2005/0044213 A1* | 2/2005 | Kobayashi | H04L 43/10 709/224 |
| 2006/0203739 A1* | 9/2006 | Padmanabhan | H04L 41/0631 370/252 |
| 2007/0110063 A1* | 5/2007 | Tang | H04L 45/02 370/390 |
| 2009/0094361 A1* | 4/2009 | Srinivasan | H04L 65/1073 709/224 |

(Continued)

OTHER PUBLICATIONS

EESR dated Jul. 30, 2018 for EP Application No. 18159716.2.
(Continued)

*Primary Examiner* — Jonathan A Bui
(74) *Attorney, Agent, or Firm* — Rowand LLP

(57) ABSTRACT

Devices and methods for managing a network communication channel are provided. The electronic device is configured to determine a list of available intermediate servers for establishing a network communication channel between the electronic device and an enterprise entity. The electronic device generates a list of aggregate round trip times. The list of aggregate round trip times include an aggregate round trip time associated with each intermediate server in the list of available intermediate servers. Each aggregate round trip time includes a front end round trip time and a back end round trip time. The electronic device selects one of the intermediate servers based on the list of aggregate round trip times and establishes the network communication channel using the selected intermediate server.

18 Claims, 6 Drawing Sheets

(56) References Cited

U.S. PATENT DOCUMENTS

| | | | |
|---|---|---|---|
| 2010/0228824 A1* | 9/2010 | Lin | H04L 12/1818 709/204 |
| 2010/0250736 A1* | 9/2010 | Kikuchi | H04L 41/12 709/224 |
| 2012/0131129 A1* | 5/2012 | Agarwal | H04L 43/0852 709/216 |
| 2012/0158996 A1* | 6/2012 | Thaler, III | H04L 43/0864 709/241 |
| 2015/0067819 A1* | 3/2015 | Shribman | H04L 67/06 726/12 |
| 2015/0131460 A1* | 5/2015 | Sridhara | H04W 48/20 370/252 |
| 2015/0281028 A1* | 10/2015 | Akhter | H04L 43/0858 370/252 |
| 2015/0319063 A1* | 11/2015 | Zourzouvillys | H04L 43/0811 370/352 |
| 2016/0191362 A1* | 6/2016 | Hwang | H04L 43/0864 370/253 |
| 2016/0294681 A1* | 10/2016 | Khakpour | H04L 45/306 |
| 2016/0380860 A1* | 12/2016 | Singhal | H04L 43/0864 709/224 |
| 2017/0155566 A1* | 6/2017 | Martinsen | H04L 41/142 |
| 2017/0264536 A1* | 9/2017 | Wood | H04L 45/54 |

OTHER PUBLICATIONS

Jason Gervia: AnyConnect Optimal Gateway Selection Operation, published on Oct. 28, 2015, https://supportforums.cisco.com/document/58711/anyconnect-optimal-gateway-selection-operation.
EPO, EP Examination Report relating to EP application No. 18159716.2, dated Feb. 25, 2019.

* cited by examiner

DEVICES AND METHODS FOR MANAGING A NETWORK COMMUNICATION CHANNEL BETWEEN AN ELECTRONIC DEVICE AND AN ENTERPRISE ENTITY

FIELD

The present application generally relates to managing network communication channels, and, in particular, managing network communication channels in a geographically distributed system of electronic devices.

BACKGROUND

Mobile devices equipped with communication subsystems are often configured to access and interact with data or application resource servers through a geographically distributed network of computing devices. Existing platforms may assign a set of Internet Protocol (IP) addresses to relay/proxy or data/application resource servers in coarsely defined geographical regions. Mobile devices may then be assigned relay/proxy or data/application resource server based on an IP address associated with a geographical region nearest to a region corresponding to the mobile device's IP address.

However, when a relay/proxy server or a data/application resource server is assigned based on IP addresses associated with a general geographical region, the mobile client may not end up connecting to a data/application resource server via the most optimal network communication channel for accessing data/application resources. Transmission and receipt of data to and from the mobile device may, for example, be delayed. Further, methods of selecting proxy/relay or application/data servers based on geographically assigned IP addresses may not account for other network or device factors that may determine the most optimal network communication channel for accessing data or application resources.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
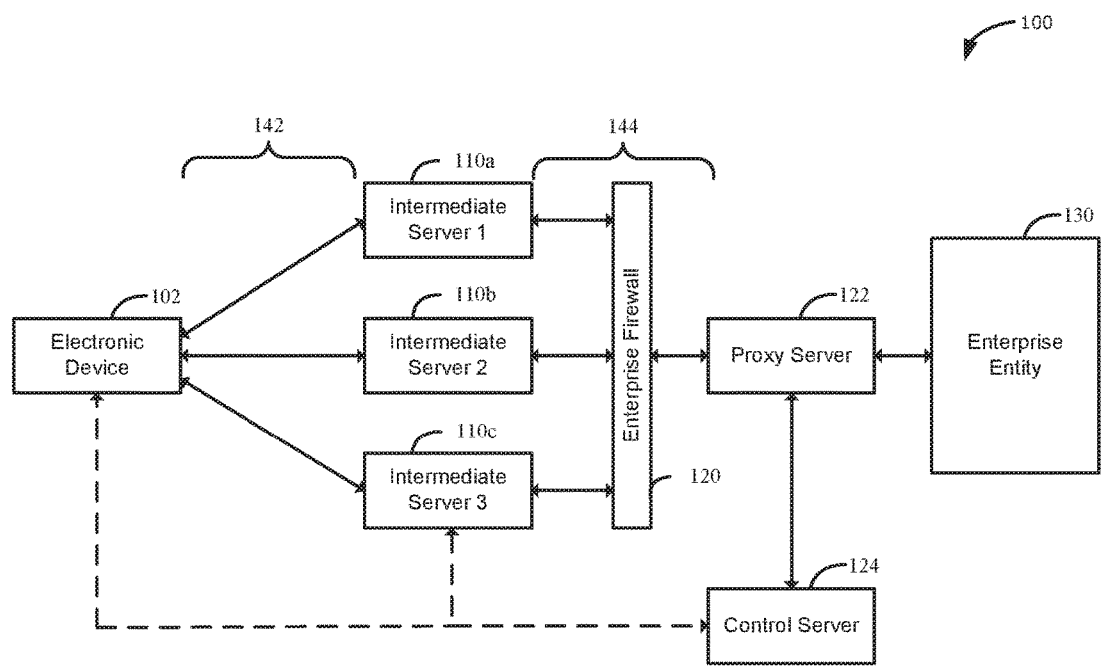
FIG. 1 is an example enterprise platform including an electronic device and an enterprise entity.

In a first aspect, the present application describes an electronic device managing a network communication channel between the electronic device and an enterprise entity. The electronic device includes a processor; a communication subsystem coupled to the processor for communicating with the enterprise entity through an intermediate server; and memory coupled to the processor and storing processor-readable instructions. When executed, the instructions cause the processor to determine a list of available intermediate servers for establishing a network communication channel between the electronic device and the enterprise entity; generate a list of aggregate round trip times, the list of aggregate round trip times including an aggregate round trip time associated with each intermediate server in the list of available intermediate servers, each aggregate round trip time includes a front end round trip time between the electronic device and an associated intermediate server and a back end round trip time between the enterprise entity and the associated intermediate server; select one of the intermediate servers from the list of available intermediate servers based on the list of aggregate round trip times; and establish the network communication channel between the electronic device and the enterprise entity using the selected intermediate server.

In another aspect, the present application describes a method of managing a network communication channel between an electronic device and an enterprise entity. The electronic device may be configured to communicate with the enterprise entity through an intermediate server. The method includes determining a list of available intermediate servers for establishing the network communication channel between the electronic device and enterprise entity; generating a list of aggregate round trip times, the list of aggregate round trip times including an aggregate round trip time associated with each intermediate server in the list of available intermediate servers, wherein each aggregate round trip time includes a front end round trip time between the electronic device and an associated intermediate server and a back end round trip time between the enterprise entity and the associated intermediate server; selecting one of the intermediate servers from the list of available intermediate servers based on the list of aggregate round trip times; and establishing the network communication channel between the electronic device and the enterprise entity using the selected intermediate server.

In yet a further aspect, the present application describes non-transitory processor-readable medium storing processor-readable instructions which, when executed, configure a processor to perform one or more of the methods described herein. In this respect, the term processor is intended to include all types of processing circuits or chips capable of executing program instructions.

Other aspects and features of the present application will be understood by those of ordinary skill in the art from a review of the following description of examples in conjunction with the accompanying figures.

Many of the example embodiments described herein relate to managing network communication channels in a geographically distributed system of electronic devices. It will be understood that some aspects of the present application are not limited to network communication channels with a particular number of intermediate/relay/proxy servers. For example, establishing a network communication channel from an electronic device to an enterprise entity may include transmitting a data bit stream through two or more levels of intermediate/relay/proxy servers. Further, aspects of the present application may be applicable to environments within a secured network (e.g., Intranet of a secured corporate environment) comprising a network of geographically distributed system of electronic devices, a wide area network (WAN) or extranet, or any combination thereof.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . ." is intended to cover any one or more of the listed elements, including any one of the listed elements alone, any sub-combination, or all of the elements, without necessarily excluding any additional elements, and without necessarily requiring all of the elements.

Mobile devices are often configured to connect to data/application resource servers via a network of geographically distributed intermediate/relay/proxy servers. The speed at which data bit streams are transmitted from and to the mobile device may depend on several factors, including relative geographical proximity of the mobile device, via intermediate/relay/proxy servers, to the data/application resource, transmission line bandwidth, response time of the intermediate/relay/proxy servers, or data throughput load on the transmission line or the intermediate/relay/proxy servers at a given time.

In some existing platform examples, an administration server may automatically prescribe or assign a network communication channel for the mobile device to use for communicating with a resource/application server. For example, the administration server may assign transmission line segments/paths and associated intermediate/relay/proxy servers to use for transmitting data bit streams to the resource/application server. In some examples, the network communication channel may be statically assigned by the administration server. Any changes in network conditions may alter the speed at which the mobile device may communicate with the resource/application server. Further, the mobile device may be a "slave device" and unable to select network communication channel based on its own criteria or factors.

As speed of data transmission to and from an electronic device may be important, it may be advantageous to provide an electronic device methods for managing a network communication channel based on empirical information associated with network communication channel components. In some embodiments, an electronic device (e.g., mobile device) may select an intermediate server from a list of available intermediate server based on a list of aggregate round trip times for establishing a network communication channel with an enterprise entity.

After an electronic device has selected an intermediate server for establishing a network communication channel, in some embodiments, the electronic device may monitor the list of aggregate round trip times to determine whether the aggregate round trip time associated with the selected intermediate server continues to be an optimal aggregate round trip time. The electronic device may select an updated intermediate server when the aggregate round trip time associated with the previously selected intermediate server is not an optimal aggregate round trip time.

In some embodiments, the electronic device may continue to monitor the established network communication channel to determine whether a front end connection between the electronic device and the selected intermediate server has degraded. When the electronic device determines that the front end connection has degraded, the electronic device may select an updated intermediate for establishing a further network communication channel.

Reference is now made to FIG. 1, which illustrates an example enterprise platform 100 including an electronic device 102 and an enterprise entity 130. The enterprise platform 100 may also include a group of intermediate servers, including a first intermediate server 110a, a second intermediate server 110b, and a third intermediate server 110c. In the description that follows, the group of available intermediate servers may be referred to collectively using the reference numeral 110. Although the group of available intermediate servers 110 illustrated in FIG. 1 includes three intermediate servers, in some embodiments, any number of intermediate servers may be in the group of available intermediate servers 110. The enterprise platform 100 may also include an enterprise firewall 120, a proxy server 122, and a control server 124.

In some embodiments, the electronic device 102 may be a mobile device, such as a smartphone or a portable computing device for accessing data or applications on the enterprise entity 130 via a network communication channel. A network communication channel may include a network path, including computing devices through which a data bit stream may be transmitted to, used by the electronic device 102 for transmitting and receiving data bit streams to and from the enterprise entity 130. The enterprise entity 130 may be implemented using one or more computing devices having processing resources and memory resources, being configured to receive and respond to requests from the electronic device 102.

In some embodiments, intermediate servers may be configured to receive and respond to requests from an electronic device 102. For example, intermediate servers may be configured to provide information about the intermediate server and services that may be currently available to the electronic device 102. For example, intermediate servers may establish a network communication channel between an electronic device 102 and an enterprise entity 130, and may accept and receive data bit streams to be transmitted and received over the established network communication channel.

In some embodiments, the enterprise entity 130 may include one or more application servers or data storage servers. For example, the enterprise entity 130 may be an electronic mail (e-mail) server for providing email services to a user of the electronic device 102. The electronic device 102 may be configured to request email from the enterprise entity 130 (e.g., pull email from the enterprise entity), and the enterprise entity 130 may be configured to transmit new email belonging to the user to the electronic device 102. Further, the electronic device 102 may be configured to synchronize the email listings provided on the electronic device 102 with the electronic mail server via the network communication channel Although the example described above includes an enterprise entity 130 having an electronic mail server, the enterprise entity 130 may include any other type of application and/or data server for providing data or application services to the electronic device 102. For example, in some embodiments, the enterprise entity 130 may be a video conferencing server for providing video conferencing services to the electronic device 102.

The electronic device 102 may be configured to communicate with the enterprise entity 130 through a selected intermediate server. The selected intermediate server may be one of a group of available intermediate servers 110. The electronic device 102 may be configured to establish a front end connection 142 with any one of the intermediate servers in the group of available intermediate servers 110. For example, the front end connection 142 may include a network connection through a local network, a mobile network, or the Internet. As will be described in the description that follows, the front end connection 142 connecting the electronic device 102 and an intermediate server may be associated with a specified front end round trip time.

In some embodiments, each intermediate server in the group of available intermediate servers 110 may be located in a disparate geographical location. For example, the first intermediate server 110*a* may be located in San Francisco (U.S.A.), the second intermediate server 110*b* may be located in Toronto (Canada), and the third intermediate server 110*c* may be located in Frankfurt (Germany) Although the described example group of available intermediate servers 110 may be located in different countries, in some other embodiments, each intermediate server in the group of available intermediate servers 110 may be located in different regions of a country or may be geographically distributed in any other way.

In some embodiments, an available intermediate server may be identified as an intermediate server that is capable of accepting a data bit stream from an electronic device 102 for transmitting to an enterprise entity 130. For example, an available intermediate server may have the processing resources to accept the data bit stream from the electronic device 102 for further transmitting the data bit stream to the enterprise entity 130. In some examples, the available intermediate server may need to have sufficient processors or processing units available (e.g., multi-tasking ability) for accepting the data bit stream from the electronic device 102. In another example, an available intermediate server may have an available network communication port for accepting the data bit stream from the electronic device 102 for further transmitting the data bit stream to the enterprise entity 130. That is, in some examples, intermediate servers may need to be setup or enabled to accept data bit streams from the electronic device 102.

As described, the selected intermediate server in the group of available intermediate servers 110 may transmit the data bit stream to the enterprise entity 130. When the selected intermediate server receives the data bit stream from the electronic device 102, the selected intermediate server may transmit the data bit stream to the enterprise entity 130 via one or more computing devices. For example, the selected intermediate server may transmit the data bit stream to the enterprise entity 130 via an enterprise firewall 120 and a proxy server 122. The enterprise firewall 120 may be a hardware and/or software system that prevents unauthorized access to or from a network. The enterprise firewall 120 may be configured to examine each data bit stream entering or leaving an enterprise network, halting data bit streams that do not meet specific security criteria. In some embodiments, the proxy server 122 may be a computing device functioning as a gateway for data bit streams to and/or from the enterprise entity 130. Although the enterprise platform 100 illustrated in FIG. 1 includes an enterprise firewall 120 and a proxy server 122, in some embodiments, the enterprise platform 100 may not include these computing devices. That is, a selected intermediate server in a group of available intermediate servers 110 may transmit a data bit directly (e.g., without transmission through any intervening computing devices) to the enterprise entity 130.

Each intermediate server in the group of available intermediate servers 110 may be configured to establish a back end connection 144 with the enterprise entity 130. For example, the back end connection 144 may include a network connection through the enterprise firewall 120 and the proxy server 122. In some embodiments, the proxy server 122 may be configured to establish a back end connection 144 to each intermediate server in the group of available intermediate servers 110. In this example, the proxy server 122 establishes the back end connection 144 to each intermediate server to comport with firewall restrictions or policies. That is, the enterprise firewall 120 may not allow computing devices located outside the enterprise firewall 120 from establishing or maintaining inbound connections. As will be described in the description that follows, each back end connection 144 may be associated with a specified back end round trip time.

For example, a first back end round trip time may be associated with a first intermediate server 110*a*, where the first back end round trip time may be a time required for a data bit stream to be transmitted from the first intermediate server 110*a*, via the enterprise firewall 120, to the proxy server 122 and back to the first intermediate server 110*a*. Similarly, the second back end round trip time may be associated with a second intermediate server 110*b*, where the second back end round trip time may be a time required for a data bit stream to be transmitted from the second intermediate server 110*b*, via the enterprise firewall 120, to the proxy server 122 and back to the second intermediate server 110*b*. And similarly, the third back end round trip time may be associated with a third intermediate server 110*c*, where the third back end round trip time may be a time required for a bit stream to be transmitted from the third intermediate server 110*c*, via the enterprise firewall 120, to the proxy server 122 and back to the third intermediate server 110*c*. Although the back end round trip time may be described as a time required for a data bit stream to be transmitted from an intermediate server, via the enterprise firewall 120, to the proxy server 122 and back to the intermediate server, the back end round trip time may also be described as a time required for a data bit stream to be transmitted from the proxy server 122, via the enterprise firewall 120, to an intermediate server and back to the proxy server 122. In some embodiments, the network path between the proxy server 122 and the enterprise entity 130 may be considered negligible, and any round trip time associated with that network path between the proxy server 122 and the enterprise entity 130 may be negligible. For example, the proxy server 122 and the enterprise entity 130 may be located in the same location, or the proxy server 122 may be a sub-system of the enterprise entity 130.

Although a back end round trip time is described as a round trip time between a selected intermediate server and the proxy server 122, in some embodiments, network path between the proxy server 122 and the enterprise entity 130 may not be negligible. Accordingly, in some embodiments, the back end round trip time may represent a round trip time between the selected intermediate server and the enterprise entity 130. That is, the back end round trip time may include the round trip time for transmitting the data bit stream from the proxy server 122 to the enterprise entity 130 and back to the proxy server 122.

In some embodiments, a control server 124 may be a computing device for generating and/or managing a list of back end round times. As described above, each intermediate server in the group of available intermediate servers 110 may be associated with a back end round trip time. The control server 124 may be configured to manage records of back end round trip time information and report back end round trip time information to the group of available intermediate servers 110 and/or to the electronic device 102. In some embodiments, the electronic device 102 may utilize the back end round trip times reported by the control server 124 for managing the network communication channel between the electronic device 102 and the enterprise entity 130.

Figure 2:
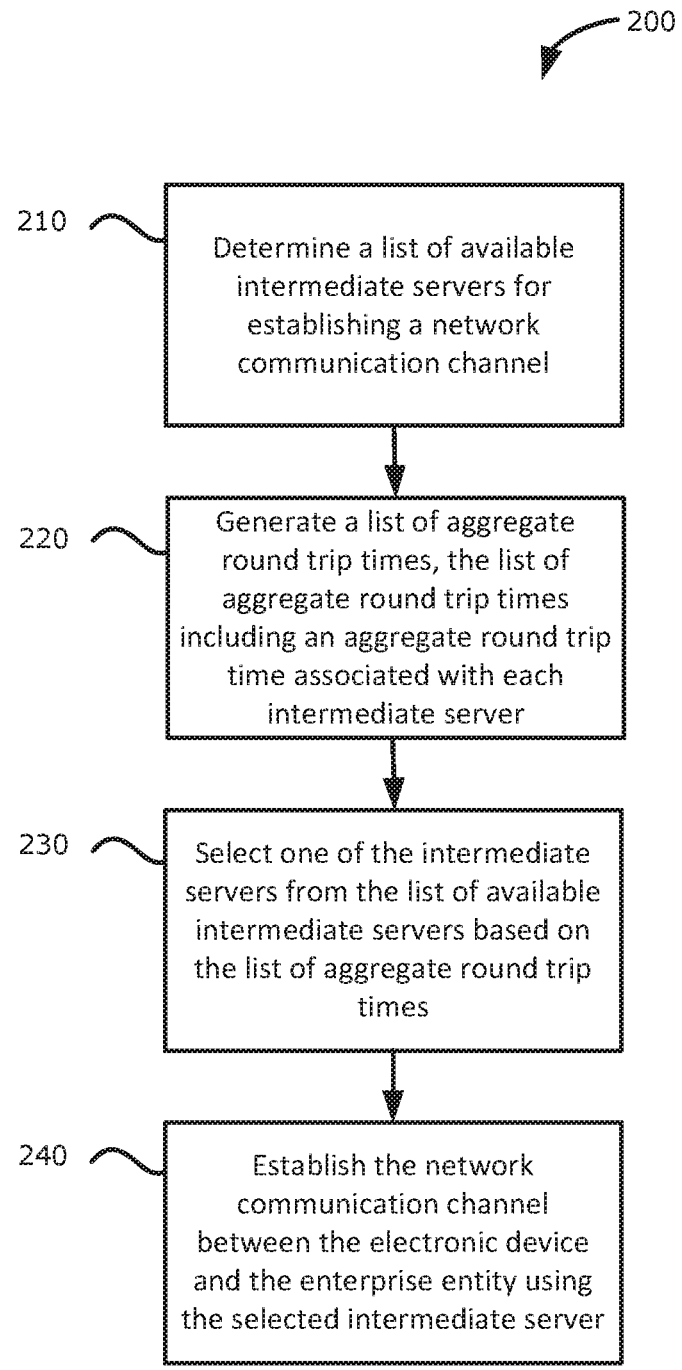
FIG. 2 is a flowchart illustrating an example method of managing a network communication channel between the electronic device and the enterprise entity.

Reference is now made to FIG. 2, which is a flowchart illustrating an example method 200 of managing a network communication channel between the electronic device 102 and the enterprise entity 130. The example method 200 of FIG. 2 may be performed by an electronic device 102 of the type described with reference to FIG. 1 or a variation of such electronic device. In some embodiments, the electronic device 102 may include processor-readable instructions that, when executed, cause a processor to perform the steps of the example method 200.

In some embodiments, the electronic device 102 may be responsible for initiating a network communication channel between the electronic device 102 and the enterprise entity 130. The electronic device 102 may be configured to communicate with the enterprise entity 130 through a selected intermediate server from a group of available intermediate servers 110.

At 210, the electronic device 102 may determine a list of available intermediate servers for establishing a network communication channel between the electronic device 102 and the enterprise entity 130. For example, the list of available intermediate servers may be a listing of the group of available intermediate servers 110 having sufficient processors or processing units available for accepting a data bit stream from the electronic device 102 and/or having an available network communication port for accepting the data bit stream from the electronic device 102.

For example, a first intermediate server 110a, a second intermediate server 110b, and a third intermediate server 110c is illustrated in the enterprise platform 100 of FIG. 1. At 210, the electronic device 102 may determine, however, that the second intermediate server 110b may be unable to accept a data bit stream. Accordingly, the electronic device 102 may determine that the list of available intermediate servers includes the first intermediate server 110a and the third intermediate server 110c.

In some embodiments, the processors or processing units of the second intermediate server 110b may be busy performing other computationally intensive tasks and may be unable to accept a data bit stream from the electronic device 102. In some other embodiments, the second intermediate server 110b may not have an available network communication port for communicating with the electronic device 102. In some embodiments, a network administrator may have flagged the second intermediate server 110b as not being available. Accordingly, the second intermediate server 110b may not be listed on the list of available intermediate servers for establishing a network communication channel between the electronic device 102 and the enterprise entity 130.

At 220, the electronic device 102 may generate a list of aggregate round trip times. The list of aggregate round trip times may include an aggregate round trip time associated with each intermediate server in the list of available intermediate servers. Each aggregate round trip time may include a front end round trip time between the electronic device 102 and an associated intermediate server. Each aggregate round trip time may also include a back end round trip time between the enterprise entity 130 and the associated intermediate server. That is, in some embodiments, the electronic device 102 may determine a list of front end round trip times between the electronic device and the intermediate servers in the list of available intermediate servers.

For example, the list of aggregate round trip times may include a first aggregate round trip time associated with the first intermediate server 110a, a second aggregate round trip time associated with the second intermediate server 110b, and a third aggregate round trip time associated with the third intermediate server 110c.

The first aggregate round trip time may include a first front end round trip time associated with a first front end connection between the electronic device 102 and the first intermediate server 110a. In some embodiments, the electronic device 102 may determine the first front end round trip time, for example, by pinging the first intermediate server 110a or sending a first test message to the first intermediate server 110a and determining an amount of time required for the electronic device 102 to receive a response message from the first intermediate server 110a in response to the first test message. The round trip time may be measured using a denomination of a second or be measured using any other measure of time.

In some embodiments, if the electronic device 102 is geographically located a large distance from the first intermediate server 110a, the first front end round trip time between the electronic device 102 and the first intermediate server 110a may be large compared to when the electronic device 102 may be geographically located a smaller distance from the first intermediate server 110a. For example, if the electronic device 102 is geographically located in Toronto (Canada) and the first intermediate server 110a is geographically located in San Francisco (U.S.A.), the first front end round trip time may be large compared to when the electronic device 102 may be geographically located in San Diego (U.S.A.) (e.g., San Diego is geographically nearer to San Francisco than Toronto is to San Francisco).

In some other embodiments, the electronic device 102 may determine the first front end round trip time, for example, by determining the physical distance between the electronic device 102 and the first intermediate server 110a. For example, the electronic device 102 may be able to utilize a global positioning system feature in the electronic device 102 and may be able to determine in which city the electronic device 102 is currently located. The electronic device 102 may estimate, based on a look-up table of estimated front end round trip times, the first front end round trip time based on the current geographical location of the electronic device 102 and the first intermediate server 110a.

In some embodiments, round trip time may be determined by associating IP addresses (or blocks of IP addresses) to geographical locations. For example, if an electronic device 102 determines its geographical location via a GPS feature and if an approximate geographical location of an intermediate server may be derived from an IP address of the intermediate server, then an approximate front end round trip time between the electronic device 102 and the intermediate server may be estimated using a look up table. That is, a front end round trip time between the electronic device 102 and the respective intermediate server may be determined based on a correlation between two geographical locations and a round trip time stored in a look up table. In some other embodiments, round trip time may be determined using a look up table containing approximate round trip time values between IP address blocks. For example, if an electronic device IP address is known and if an intermediate server IP address is known, the approximate round trip time between the electronic device and the intermediate server may be read from a table of estimate round trip times.

Although the first front end round trip time is described as being determined using ping/test messages or using a look-up table, the first front end round trip time may be determined by any other suitable method for determining the time required for a data bit stream to travel from the electronic device 102 to the first intermediate server 110*a* and back to the electronic device 102.

The first aggregate round trip time may also include a back end round trip time between the enterprise entity 130 and the first intermediate server 110*a*. As described in the description above, in some embodiments, the back end round trip time may be a round trip time between the proxy server 122 associated with the enterprise entity 130, via the enterprise firewall 120, and the first intermediate server 110*a*. A network path between the proxy server 122 and the enterprise entity 130 may be regarded as negligible.

In some other embodiments where the network communication channel between the proxy server 122 and the enterprise entity 130 may not be negligible, the back end round trip time may be a round trip time between the enterprise entity 130, via the proxy server 122 and the enterprise firewall 120, and the first intermediate server 110*a*. In some embodiments, the back end round trip time may also be determined using ping/test messages or using a look-up table, as described in the description above relating to the front end round trip time.

When the back end round trip time is the round trip time between a proxy server 122 and an intermediate server in the group of available intermediate servers 110, in some embodiments, the proxy server 122 may be configured to determine the back end round trip time between that proxy server 122 and an intermediate server and, subsequently, report the determined back end round trip time to a control server 124 (FIG. 1). Accordingly, the electronic device 102 may receive a list of back end round trip times from the control server 124.

In some embodiments, the proxy server 122 may periodically determine the back end round trip time between the proxy server 122 and each of the intermediate servers in the group of available intermediate servers 110. For example, after a fixed duration of time has elapsed, the proxy server 122 may determine a first back end round trip time between the proxy server 122 and the first intermediate server 110*a*, a second back end round trip time between the proxy server 122 and the second intermediate server 110*b*, and a third back end round trip time between the proxy server 122 and the third intermediate server 110*c*. For example, the fixed duration of time may be two minutes. Accordingly, the proxy server 122 may determine a first back end round trip time, a second back end round trip time, and a third back end round trip time every two minutes and, subsequently, report each of the determined back end round trip times to the control server 124. In some other embodiments, the proxy server 122 may report the list of back end round trip times when a request is received from the control server 124.

As the control server 124 may receive, store, and manage back end round trip times associated with each intermediate server in the group of available intermediate servers 110, in some embodiments, the control server 124 may report the back end round trip times associated with each intermediate server to either the electronic device or the respective associated intermediate server. In some embodiments, the control server 124 may report the back end round trip times at fixed intervals of times when a fixed duration of time has elapsed. In some other embodiments, the control server 124 may report the back end round trip times when the back end round trip times associated with each intermediate server is requested by the electronic device 102 and/or by the group of available intermediate servers 110.

Although the above example describes the proxy server 122 reporting determined back end round trip times to the control server 124, in some embodiments, the proxy server 122 and the control server 124 may be an inter-related or may be the same computing device and may be responsible for reporting determined back end round trip times associated with respective available intermediate servers.

As illustrated in some embodiments described herein, the electronic device 102 may generate the list of aggregate round trip times based on: (1) the back end round trip times reported by the control server 124 and/or the proxy server 122; and (2) the front end round trip times determined by the electronic device 102. In some embodiments, each aggregate round trip time may include a summation of the front end round trip time and the back end round trip time of the associated intermediate server. That is, the each aggregate round trip time includes the front end round trip time added to the back end round trip time. In some embodiments, the front end roundtrip time and the back end round trip time may be multiplied by a weighted factor before being added to provide an aggregate round trip time.

As described above, an aggregate round trip time may be associated with an intermediate server in the group of available intermediate servers 110. For example, a first aggregate round trip time may be associated with the first intermediate server 110*a*. For example, the first aggregate round trip time may be a summation of the front end round trip time associated with the first intermediate server and the back end round trip time associated with the first intermediate server. That is, the first aggregate round trip time may be a round trip time duration for a data bit stream to travel over a network communication channel from the electronic device 102, via the first intermediate server 110*a*, the enterprise firewall 120, and the proxy server 122, to the enterprise entity 130 and back to the electronic device 102.

Similarly, a second aggregate round trip time associated with the second intermediate server 110*b* and a third aggregate round trip time associated with the third intermediate server 110*c* may be determined in the same way as the first aggregate round trip time.

At 230, the electronic device 102 may select one of the intermediate servers in the list of available intermediate servers 110 based on the list of aggregate round trip times. For example, once the list of aggregate round trip times (e.g., first, second, and third aggregate round trip times) are generated, the electronic device 102 may select which intermediate server in the group of available intermediate servers 110 to utilize for establishing a network communication channel with the enterprise entity 130.

In some embodiments, the electronic device 102 may select one of the intermediate servers based on an optimal aggregate round trip time in the list of aggregate round trip times. For example, the electronic device 102 may include processor-readable instructions that, when executed, cause the processor to identify an optimal aggregate round trip time and select the intermediate server associated with the identified optimal aggregate round trip time.

In some embodiments, electronic device 102 may determine that the optimal aggregate round trip time is a minimum aggregate round trip time in the list of aggregate round trip times. For example, the electronic device 102 may list the aggregate round trip times in order from largest to smallest and, subsequently, identify in the list of aggregate round trip times the round trip time having the least time duration. The electronic device 102 may determine which intermediate server is associated with the aggregate round trip time having the least time duration, and accordingly select that intermediate server for establishing the network communication channel.

For example, the electronic device 102 may determine that the first aggregate round trip time associated with the first intermediate server 110a is 30 milliseconds, that the second aggregate round trip time associated with the second intermediate server 110b is 21 milliseconds, and that the third aggregate round trip time associated with the third intermediate server 110c is 37 milliseconds. The electronic device 102 may regard the optimal aggregate round trip time as the minimum aggregate round trip time and determine that the optimal aggregate round trip time is associated with the second intermediate server 110b. Accordingly, in the present example, based on the list of aggregate round trip times, the electronic device may select the second intermediate server 110b.

In some other embodiments, the electronic device 102 may utilize the identified optimal aggregate round trip time in conjunction with another evaluative criteria for selecting an intermediate server. If the identified optimal aggregate round trip time in the list of aggregate round trip times is associated with two or more intermediate servers in the list of available intermediate servers 110 (e.g., two or more intermediate servers are associated with an aggregate round trip time having the same value), the electronic device 102 may select an intermediate server based on a weighting factor. For example, a higher weighting factor may be assigned to a previously flagged preferred intermediate server, and respective weighting factors may be used for selecting an intermediate server among available intermediate servers associated with approximately the same aggregate round trip time.

At 240, as suggested above, the electronic device 102 may establish the network communication channel between the electronic device 102 and the enterprise entity 130 using the selected intermediate server in the group of available intermediate servers 110. For example, continuing with the example described above, the electronic device 102 may establish the network communication channel between the electronic device 102 and the enterprise entity 130 using or through the second intermediate server 110b.

Figure 3:
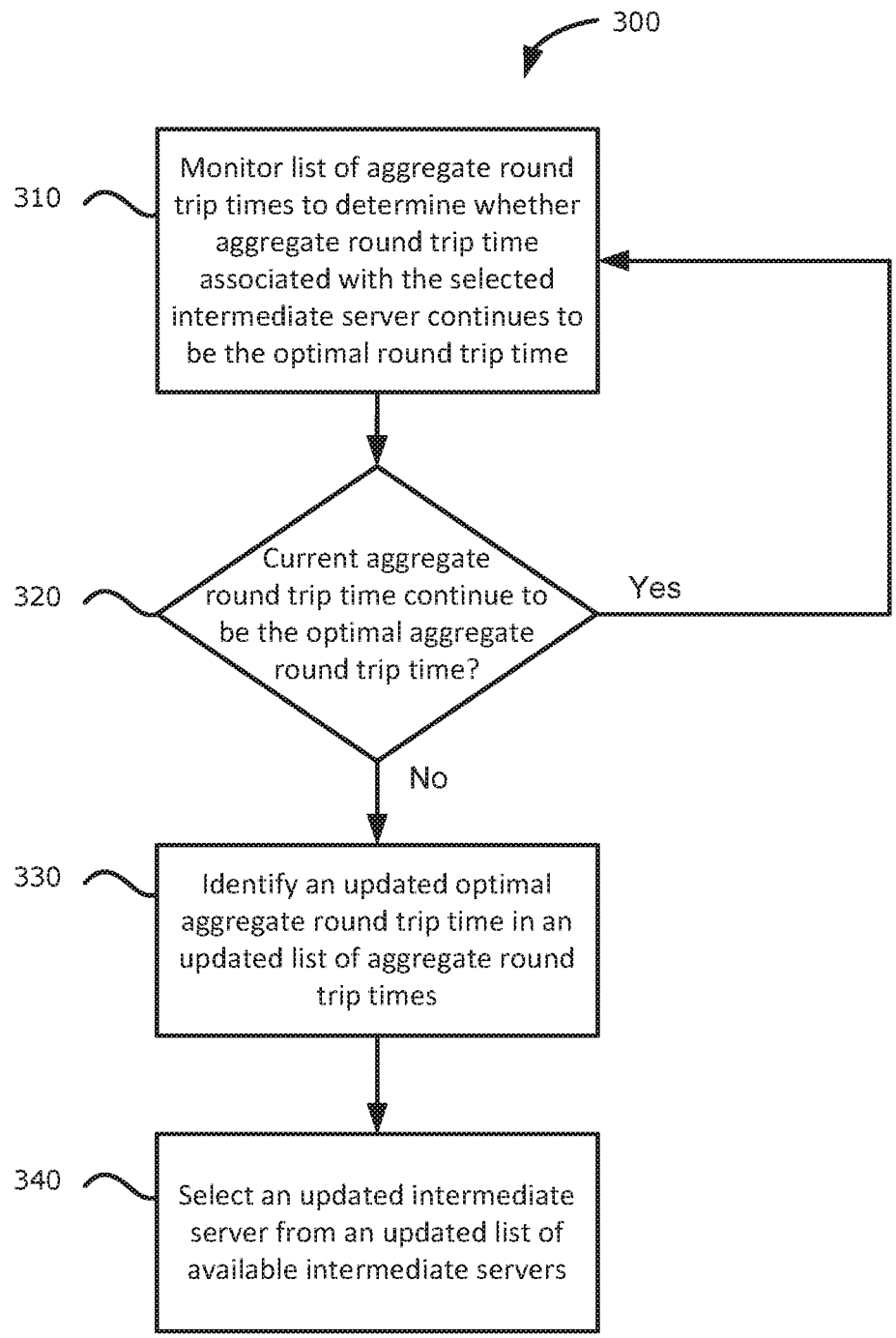
FIG. 3 is a flowchart illustrating another example method of managing the network communication channel between the electronic device and the enterprise entity.

Reference is now made to FIG. 3, which is a flowchart illustrating another example method 300 of managing the network communication channel between the electronic device 102 and the enterprise entity 130. The example method 300 of FIG. 3 may be performed by an electronic device 102 of the type described with reference to FIG. 1 or a variation of such electronic device. In some embodiments, the electronic device 102 may include processor-readable instructions that, when executed, cause a processor to perform the steps of the example method 300 of FIG. 3.

In some embodiments, the electronic device 102 may perform the step, at 220 (FIG. 2), of generating the list of aggregate round trip times at periodic time intervals. For example, the electronic device 102 may repeatedly generate the list of aggregate round trip times after a fixed duration of time has elapsed. For example, if the fixed duration of time is 30 seconds, the electronic device 102 may generate an updated list of aggregate round trip times every 30 seconds. As will be described below, by generating an updated list of aggregate round trip times at periodic time intervals, the electronic device 102 may dynamically determine whether a current optimal aggregate round trip time continues to be the optimal aggregate round trip time.

At 310, the electronic device 102 may monitor the list of aggregate round trip times to determine whether the aggregate round trip time associated with the selected intermediate server continues to be the optimal aggregate round trip time. In some embodiments, the step of generating the list of aggregate round trip times may be performed at periodic time intervals. As the electronic device 102 may periodically generate an updated list of aggregate round trip times at periodic time intervals, at 320 the electronic device 102 may, after each updated list of aggregate round trip times is generated, evaluate whether the aggregate round trip time associated with the selected intermediate continues to be the optimal aggregate round trip time.

In an example, the electronic device 102 may be a mobile device that may be traveling from Canada into the United States. The currently selected intermediate server may be geographically located in Toronto (Canada). As described, an aggregate round trip time may include a front end round trip time, between the mobile device and an associated intermediate server, and a back end round trip time, between the enterprise entity 130 and the associated intermediate server. Thus, if the front end round trip time associated with the currently selected intermediate server were to increase when the electronic device 102 is travelling from Canada into the United States, the aggregate round trip time associated with the currently selected intermediate server may also correspondingly increase.

When the electronic device 102 determines that the aggregate round trip time associated with the selected intermediate server no longer continues to be the optimal (or minimum) aggregate round trip time in a list of updated aggregate round trip times, at 330, the electronic device 102 may identify an updated optimal aggregate round trip time in the list of updated aggregate round trip times. That is, if and when the electronic device 102 changes position relative to each intermediate server in the list of available intermediate servers 110, each aggregate round trip time associated with each intermediate server may change and the aggregate round trip time associated with the currently selected intermediate server may no longer be the optimal aggregate round trip time.

Once the electronic device 102 identifies an updated optimal aggregate round trip time, at 340, the electronic device 102 may select an updated intermediate server from the group of available intermediate servers 110. The selected updated intermediate server may be associated with the identified updated optimal aggregate round trip time.

In some embodiments, if an electronic device 102 is traveling near a mid-point between a first intermediate server 110a and a second intermediate server 110b, a first aggregate round trip time associated with the first intermediate server 110a and a second aggregate round trip time associated with the second intermediate server 110b may be approximately the same. In this example, the electronic device 102 may determine that an aggregate round trip time associated with a currently selected intermediate server continues to be an optimal aggregate round trip time based on a threshold value. As an illustrative example, the first aggregate round trip time associated with the first intermediate server 110a may fluctuate between 100 milliseconds and 115 milliseconds. The first aggregate round trip time associated with the first intermediate server 110a may fluctuate due to one or more factors, including response time of the first intermediate server 110a, varying geographical location of the electronic device 102 relative to the first intermediate server 110a, or other factors that may affect a round trip time between the electronic device 102 and the first intermediate server 110*a*. Continuing with the example, the second aggregate round trip time associated with the second intermediate server 110*b* may be approximately 110 milliseconds.

To avoid an oscillating situation where the electronic device 102 may cyclically switch from establishing a network communication channel using the first intermediate server 110*a* and to establishing a network communication channel using the second intermediate server 110*b*, and vice versa, when the determined first aggregate round trip time fluctuates between 100 milliseconds and 115 milliseconds, in some embodiments, the electronic device 102 may determine that a first aggregate round trip time continues to be an optimal aggregate round trip time based on a change threshold value, for example, of 20%. That is, the change threshold value may be a threshold percentage of the aggregate round trip time associated with the selected intermediate server. In the above example, the electronic device 102 may be configured to determine that an aggregate round trip time associated with the first intermediate server 110*a* continues to be an optimal aggregate round trip time until a determination that the current aggregate round trip time changes by more than 20% of a baseline value. In the present example, the electronic device 102 may deem the first aggregate round trip time as the optimal aggregate round trip time until such time that the updated first aggregate round trip time exceeds 120 milliseconds. Accordingly, the electronic device 102 may not cause the processor to identify any updated optimal aggregate round trip time in the list of updated aggregate round trip time until the electronic device 102 determines that an aggregate round trip time associated with the first intermediate server 110*a* has exceeded the preset threshold value (e.g., 20% of a baseline aggregate round trip time value). In some embodiments, the electronic device 102 may receive input from a user to specify the preset threshold value.

At 320, if the electronic device 102 determines that the current aggregate round trip time associated with the intermediate server through which the network communication channel is currently established continues to be the optimal aggregate round trip time, the electronic device 102 may, at 310, continue to monitor the list of aggregate round trip times at 310.

Figure 4:
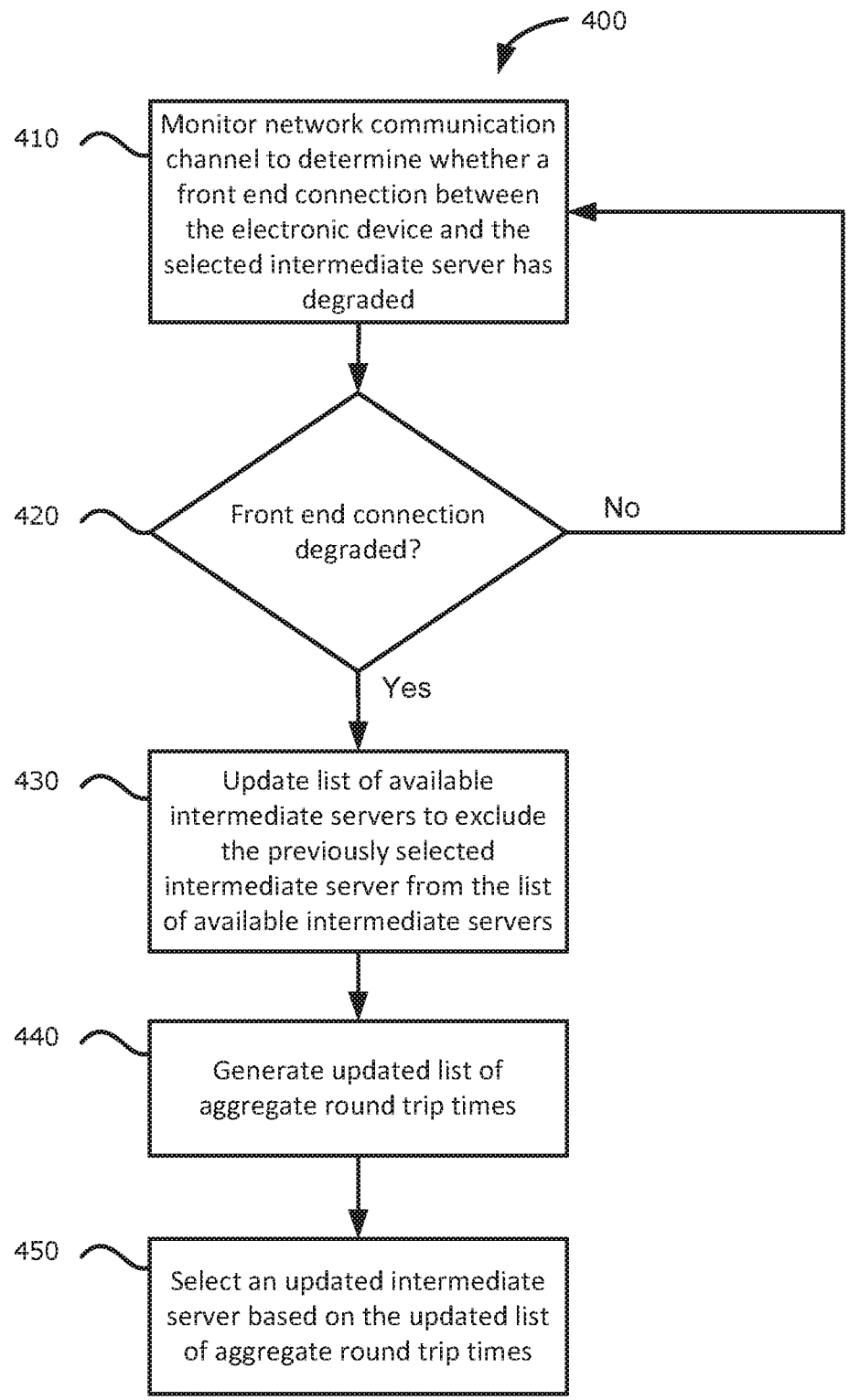
FIG. 4 is a flowchart illustrating another example method of managing the network communication channel between the electronic device and the enterprise entity.

Reference is now made to FIG. 4, which is a flowchart illustrating another example method 400 of managing the network communication channel between the electronic device 102 and the enterprise entity 130. The example method 400 of FIG. 4 may be performed by an electronic device 102 of the type described with reference to FIG. 1 or a variation of such electronic device. In some embodiments, the electronic device 102 may include processor-readable instructions that, when executed, cause a processor to perform the steps of the example method 400 of FIG. 4.

At 410, the electronic device 102 may monitor the network communication channel to determine whether a front end connection 142 between the electronic device 102 and the selected intermediate server has degraded.

At 420, when the electronic device 102 has determined that the front end connection 142 between the electronic device 102 and the selected intermediate device has degraded, the electronic device 102 may, at 430, update the list of available intermediate servers to exclude the previously selected intermediate server from the list of available intermediate servers.

For example, because the electronic device 102 has determined that the front end connection 142 with the previously selected intermediate server is no longer of an acceptable quality for establishing a network communication channel from the electronic device 102 to the enterprise entity 130, the electronic device 102 may remove the previously selected intermediate server from consideration when selecting an intermediate server to communicate with.

In some embodiments, the response time of an intermediate server may also contribute to a determination that the front end connection 142 has degraded. For example, if the electronic device 102 is attempting to determine a front end round trip time with the said intermediate server, and if the said intermediate server fails to respond within a preset time, the electronic device 102 may determine that the front end connection 142 may have degraded. That is, an electronic device 102 may deem that a front end connection 142 to an intermediate server to be broken if the said intermediate server is unresponsive or provides sluggish timed responses.

In some embodiments, if the electronic device 102 determines that a first front end connection between the electronic device 102 and the first intermediate server 110*a* is broken, the electronic device may update the list of available intermediate servers to exclude the first intermediate server 110*a*. For example, if an administrator disables network communication ports of the first intermediate server 110*a*, the electronic device 102 may determine that the front end connection between the electronic device 102 and the first intermediate server 110*a* is broken.

If, however, the electronic device 102, at 420, determines that the front end connection 142 associated with the current intermediate server through which the network communication channel is currently established has not degraded, the electronic device 102 may, at 410, continue to monitor the network communication channel to determine whether the front end connection 142 between the electronic device 102 and the currently selected intermediate server has degraded.

Once the electronic device 102, at 430, has updated the list of available intermediate servers that may be used to establish a network communication channel between the electronic device 102 and the enterprise entity 130, at 440, the electronic device 102 may generate an updated list of aggregate round trip round trip times. The list of updated aggregate round trip times may include an aggregate round trip time associated with each intermediate server in the list of updated available intermediate servers.

At 450, the electronic device 102 may select an updated intermediate server based on the updated list of aggregate round trip times associated with each of the intermediate servers in the updated list of available intermediate servers.

Figure 5:
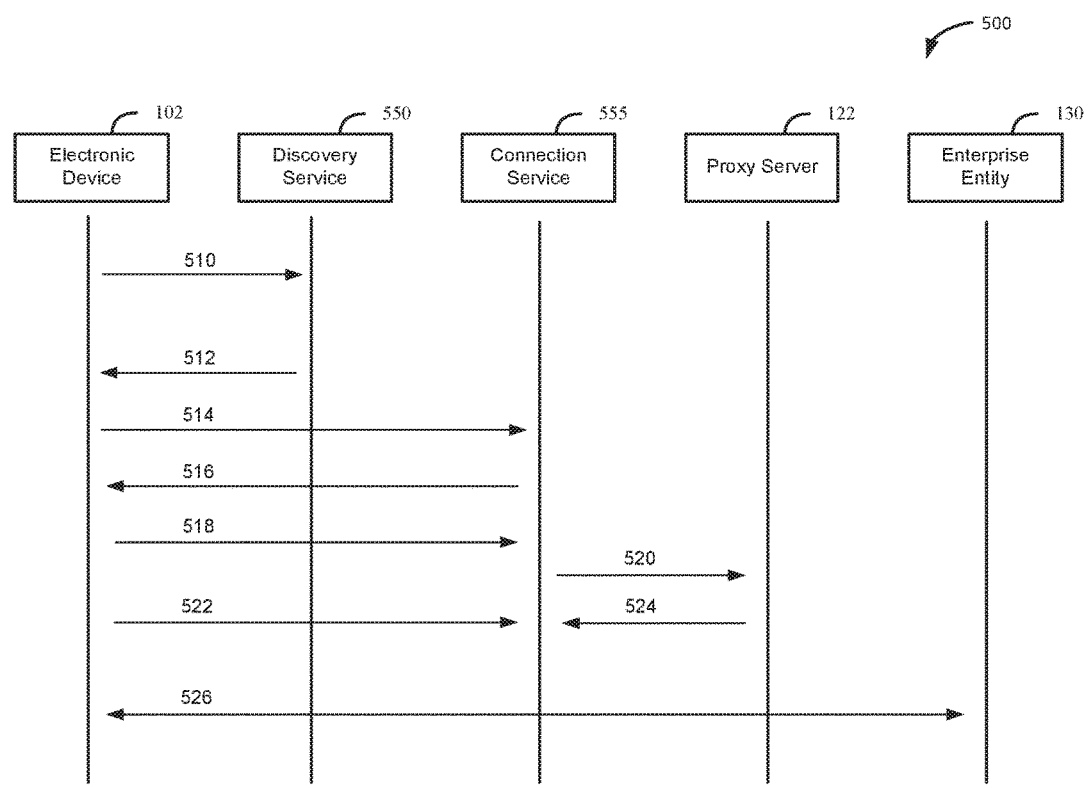
FIG. 5 is a signal diagram illustrating an example method of establishing a network communication channel between the electronic device and the enterprise entity.

Reference is now made to FIG. 5, which is a signal diagram 500 illustrating an example method of establishing a network communication channel between the electronic device 102 and the enterprise entity 130. The signal diagram 500 of FIG. 5 illustrates an example sequence of signals that may be sent to and from the different computing devices and/or components in the enterprise platform 100 of FIG. 1. As described in the description herein, the enterprise platform 100 may include the electronic device 102, the proxy server 122 and the enterprise entity 130, as described with reference to FIG. 1.

Further, FIG. 5 illustrates a discovery service 550 and a connection service 555. The discovery service 550 may be a computing unit containing processor-readable instructions that, when executed, cause a processor to provide the electronic device 102 with information about intermediate servers that are currently available to the electronic device 102. For example, if the second intermediate server 110*b* (FIG. 1) is not available to the electronic device 102 for establishing a network communication channel between the electronic device 102 and the enterprise entity 130, the discovery service 550 may only provide information about the first intermediate server 110*a* (FIG. 1) and the third intermediate server 110*c* (FIG. 1) to the electronic device 102. In some embodiments, the discovery service 550 may also provide information about intermediate servers that may be currently unavailable, in testing, or merely in planning for future deployment.

Accordingly, the discovery service 550 may be able to customize a list of available intermediate servers that may be sent to an electronic device 102 based on information known to the discovery service 550. In some embodiments, the discovery service 550 may be implemented on a computing device dedicated for generating a list of available intermediate servers. In some other embodiments, portions of the discovery service 550 may be implemented on each intermediate server in the group of intermediate servers, and information from each portion of the discovery service 550 may be combined by a dedicated computing device or one of the intermediate servers.

FIG. 5 also illustrates a connection service 555. In some embodiments, the connection service 555 may be a computing unit containing processor-readable instructions that, when executed, cause a processor to facilitate a network communication channel between the electronic device 102 and the enterprise entity 130. In some embodiments, the connection service 555 may be implemented by the group of available intermediate servers 110. When an intermediate server in the group of available intermediate servers 110 is selected, the connection service 555 may be configured to interact with, for example, the electronic device 102 and the proxy server 122. In some embodiments, the proxy server 122 may maintain a connection with the connection service 555 for receiving relay setup requests.

Referring now to the signal diagram 500 illustrated in FIG. 5, at 510, the electronic device 102 may initiate a command to the discovery service 550 for retrieving a list of available intermediate servers. In one example, the electronic device 102 may issue a "getNOCinfo(terminalID)" command to the discovery service 550. For example, the term "NOC" may refer to a "network operations center", an example implementation of an intermediate server in the enterprise platform 100 of FIG. 1. Further, when the "getNOCinfo(terminalID)" command is sent by the electronic device 102 to the discovery service 550, the discovery service 550 may identify which the electronic device 102 (e.g., terminal ID) is making the request for the list of available intermediate servers. In response, the discovery service 550 may provide the electronic device 102 with back end round trip times associated with intermediate servers and proxy servers/enterprise entities that the electronic device 102 may establish a network communication channel with.

At 512, the discovery service 550 may transmit a list of available intermediate servers 110 to the electronic device 102. For example, the discovery service 550 may transmit a "NOCInfoList" command to the electronic device.

At 514, the electronic device 102 may parse the received list of available intermediate servers and determine which of the available intermediate servers the electronic device 102 may select for establishing a network communication channel with the enterprise entity 130. The received list of available intermediate servers may also include a list of back end round trip times. The list of back end round trip times are back end round trip times between each of the respective available intermediate servers and proxy servers/enterprise entities to which the electronic device 102 may establish a network communication channel with. When the electronic device 102 receives the list of back end round trip times, the electronic device 102 may also determine respective front end round trip times for each of the respective available intermediate servers. The electronic device 102 may subsequently calculate a list of aggregate round trip times. Each aggregate round trip time in the list of aggregate round trip times may be associated with one of the available intermediate servers.

As described herein, in some embodiments, the electronic device 102 may select an intermediate server that is associated with an optimal aggregate round trip time. In some embodiments, the electronic device 102 may select the intermediate server associated with the minimum aggregate round trip time.

At 514, the electronic device 102 may transmit an authentication request to the selected intermediate server. That is, the electronic device 102 may transmit the authentication request to the connection service 555 associated with the selected intermediate server. For example, if the electronic device 102 determines that the optimal round trip time is associated with the third intermediate server 110*c*, the electronic device 102 may transmit the authentication request to the connection service 555 that may be associated with the third intermediate server 110*c*.

If the connection service 555 determines that the electronic device 102 from which the authentication request was sent is permitted to establish a network communication channel with the enterprise entity 130 via the selected intermediate server, at 516, the connection service 555 may transmit an authentication result to the electronic device 102 notifying the electronic device 102 that the selected intermediate server may be used for establishing a network communication channel.

At 518, the electronic device 102 may transmit a relay server setup message to the connection service 555, and at 520, the connection service 555 may also transmit a relay server setup message to the proxy server 122. As an illustrating example, the relay server setup message may include "RelaySetup(intermediateServerName)".

At 522, the electronic device 102 may establish a front end connection 142 (FIG. 1) with the connection service 555 associated with the selected intermediate server. At 524, the proxy server 122 may establish a back end connection 144 with the connection service 555 associated with the selected intermediate server.

Accordingly, at 526, a network communication channel may be established between the electronic device 102 and the enterprise entity via the connection service 555 associated with the selected intermediate server. In the illustrated example described with reference to the signal diagram 500 of FIG. 5, the round trip time between the proxy server 122 and the enterprise entity 130 may be negligible. As such, the electronic device 102 may select the intermediate server, for example at 514, based on the front end round trip times between the electronic device 102 and the list of available intermediate servers and the back end round trip times between the proxy server 122 and the list of available intermediate servers.

Figure 6:
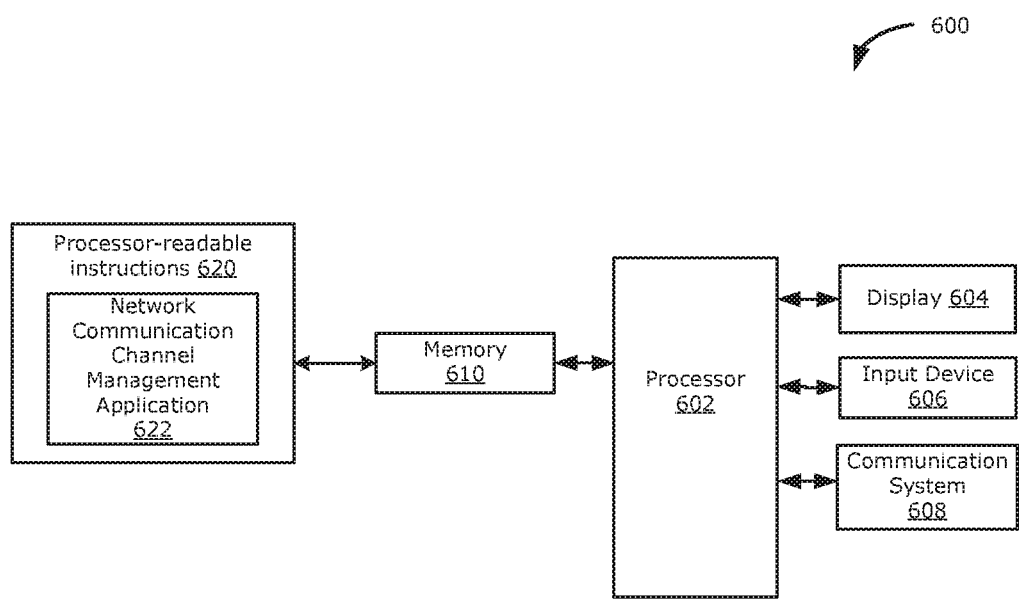
FIG. 6 is an example computing device in accordance with an embodiment of the present application.

Reference is now made to FIG. 6, which illustrates in block diagram form a simplified example of a computing device 600. In some embodiments, the computing device 600 may be a simplified example of an electronic device 102 of FIG. 1 implementing at least one of the example methods of managing the network communication channel between the electronic device 102 and the enterprise entity 130.

In some embodiments, the computing device 600 may be a personal computer such as a laptop or desktop computer. In some embodiments, it may be a mobile device, such as a smartphone, tablet, phablet, smartwatch, or combination thereof. The computing device 600 may include at least one processor 602 (or processing unit), memory 610, and a communication system 608. In some embodiments, the at least one processor 602 may include two or more processors.

The communication system 608 may include subsystems for wired or wireless data communication and wired or wireless voice communication. In some embodiments, the communication system 608 may include a subsystem for cellular data and voice connectivity via a cellular system. The cellular system may include a system operating in accordance with one or more of a variety of cellular voice and data protocols for connectivity and communication, including 5G, 4G, and 3G systems. The communication system 608 may further include a subsystem for wireless local area network (WLAN) connectivity with an access point, which may operate in accordance with the IEEE 802.11 protocol, for example. The communication system 608 may provide the computing device 600 with other wired or wireless connections for accessing and receiving data from networks or other computing devices.

The computing device 600 may also include a display 604 and at least one input device 606. In some embodiments, the at least one input device 606 may include a touch sensitive overlay on the display 604 for detecting touch-based input, for example. Other examples of the input device 606 may include a keyboard, keypad, touchpad, mouse, keyboard with touch-sensitive surface, or various buttons. In some embodiments, the input device 606 may include a motion sensor, such as a gyroscope or accelerometer for detecting movement of the computing device 600 and identifying and classifying gestures as part of a gesture-based input process. In some embodiments, the input device 606 includes a port or other communication path for receiving input via an external peripheral device, such as a mouse, keyboard, wand, pen, smartphone, smartwatch, etc.

The memory 610 may include volatile and non-volatile memory. At least a part of the memory 610 may store processor-readable instructions 620 that, when executed by the processor 602, cause the processor 602 to carry out some of the operations described herein. The processor-readable instructions 620 stored in memory 610 may include an operating system that implements basic device functions and creates a run-time environment within which other software is executed. The memory 610 may also store a plurality of applications, where the term "application" refers to a set of program-executable instructions that configure or adapt the processor 602 to carry out a particular algorithm or set of steps or operations. Example applications may include a messaging application, a word processing application, a calculator, a calendar, a music library, a social media application, a browser, or other such applications. In some embodiments, the applications may also include a network communication channel management application 622 configured to manage a network communication channel between an electronic or computing device and an enterprise entity 130, where the electronic or computing device may be configured to communicate with the enterprise entity 130 through an intermediate server.

In some embodiments, the network communication channel management application 622 may include processor-readable instructions that, when executed, cause a processor 602 to implement any of the operations described herein, such as determining a list of available intermediate servers for establishing a network communication channel, generating a list of aggregate round trip times, selecting one of the intermediate servers from the list of available intermediate servers based on the list of aggregate round trip times, and establishing the network communication channel using the selected intermediate server.

In some embodiments, the intermediate servers in the group of available intermediate servers 110 and the enterprise entity 130 may also be implemented using one or more computing devices 600 having processing resources and memory resources, as described herein. For example, intermediate servers may be configured to receive and respond to requests from an electronic device 102. For example, intermediate servers may be configured to provide information about the intermediate server and services that may be currently available to the electronic device 102. In another example, intermediate servers may establish a network communication channel between an electronic device 102 and an enterprise entity 130, and may accept and receive data bit streams to be transmitted and received over the established network communication channel. In another example, an enterprise entity 130 may be an electronic mail (e-mail) server for providing email services to a user of an electronic device 102. The enterprise entity 130 may be configured to transmit new email belonging to the user to the electronic device 102. In some other examples, the enterprise entity 130 may be a video conferencing server for providing video conferencing services to the electronic device 102.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. An electronic device comprising:
a processor;
a communication system coupled to the processor for communicating with an enterprise entity through an intermediate server; and
memory coupled to the processor and storing processor-readable instructions that, when executed, cause the processor to:
determine a list of available intermediate servers for establishing a network communication channel between the electronic device and the enterprise entity;
generate a list of aggregate round trip times, the list of aggregate round trip times including an aggregate round trip time associated with each intermediate server in the list of available intermediate servers, wherein each aggregate round trip time includes a front end round trip time between the electronic device and an associated intermediate server and a back end round trip time between the enterprise entity and the associated intermediate server, and wherein the back end round trip time is measured by and received from a control server distinct from the electronic device and the intermediate servers in the list of available intermediate servers;

select one of the intermediate servers from the list of available intermediate servers based on the list of aggregate round trip times; and establish the network communication channel between the electronic device and the enterprise entity using the selected intermediate server.

2. The electronic device of claim 1, wherein each aggregate round trip time includes a summation of the front end round trip time and the back end round trip time of the associated intermediate server.

3. The electronic device of claim 1, wherein to generate the list of aggregate round trip times includes processor-readable instructions causing the processor to:

determine a list of front end round trip times between the electronic device and the intermediate servers in the list of available intermediate servers.

4. The electronic device of claim 1, wherein to select one of the intermediate servers from the list of available intermediate servers includes processor-readable instructions causing the processor to:

identify an optimal aggregate round trip time in the list of aggregate round trip times; and select the intermediate server associated with the optimal aggregate round trip time.

5. The electronic device of claim 4, wherein the optimal aggregate round trip time is a minimum aggregate round trip time in the list of aggregate round trip times.

6. The electronic device of claim 4, wherein the processor-readable instructions to generate the list of aggregate round trip times is performed at periodic time intervals, wherein the processor-readable instructions further cause the processor to:

monitor the list of aggregate round trip times to determine whether the aggregate round trip time associated with the selected intermediate server continues to be the optimal aggregate round trip time;

when the aggregate round trip time associated with the selected intermediate server is no longer the optimal aggregate round trip time in the list of aggregate round trip times, identify an updated optimal aggregate round trip time in an updated list of aggregate round trip times; and select an updated intermediate server from the list of available intermediate servers, the selected updated intermediate server being associated with the updated optimal aggregate round trip time.

7. The electronic device of claim 6, wherein determining whether the aggregate round trip time associated with the selected intermediate server continues to be the optimal aggregate round trip time is determined based on a threshold percentage of the aggregate round trip time associated with the selected intermediate server.

8. The electronic device of claim 1, the processor-readable instructions further cause the processor to:

monitor the network communication channel to determine whether a front end connection between the electronic device and the selected intermediate server has degraded;

when the front end connection between the electronic device and the selected intermediate device has degraded, update the list of available intermediate servers to exclude the previously selected intermediate server from the list of available intermediate servers;

generate an updated list of aggregate round trip times; and select an updated intermediate server based on the updated list of aggregate round trip times.

9. The electronic device of claim 8, wherein the front end connection between the electronic device and the selected intermediate server has degraded when the front end connection is broken.

10. A method of managing a network communication channel between an electronic device and an enterprise entity, the electronic device being configured to communicate with the enterprise entity through an intermediate server, the method comprising:

determining a list of available intermediate servers for establishing the network communication channel between the electronic device and the enterprise entity;

generating a list of aggregate round trip times, the list of aggregate round trip times including an aggregate round trip time associated with each intermediate server in the list of available intermediate servers, wherein each aggregate round trip time includes a front end round trip time between the electronic device and an associated intermediate server and a back end round trip time between the enterprise entity and the associated intermediate server, and wherein the back end round trip time is measured by and received from a control server distinct from the electronic device and the intermediate servers in the list of available intermediate servers;

selecting one of the intermediate servers from the list of available intermediate servers based on the list of aggregate round trip times; and establishing the network communication channel between the electronic device and the enterprise entity using the selected intermediate server.

11. The method of claim 10, wherein each aggregate round trip time includes a summation of the front end round trip time and the back end round trip time of the associated intermediate server.

12. The method of claim 10, wherein generating the list of aggregate round trip times includes determining a list of front end round trip times between the electronic device and the intermediate servers in the list of available intermediate servers.

13. The method of claim 10, wherein selecting one of the intermediate servers from the list of available intermediate servers includes:

identifying an optimal aggregate round trip time in the list of aggregate round trip times; and selecting the intermediate server associated with the optimal aggregate round trip time.

14. The method of claim 13, wherein the optimal aggregate round trip time is a minimum aggregate round trip time in the list of aggregate round trip times.

15. The method of claim 13, wherein generating the list of aggregate round trip times is performed at periodic time intervals, wherein the method further comprises:

monitoring the list of aggregate round trip times to determine whether the aggregate round trip time associated with the selected intermediate server continues to be the optimal aggregate round trip time;

when the aggregate round trip time associated with the selected intermediate server is no longer the optimal aggregate round trip time in the list of aggregate round trip times, identify an updated optimal aggregate round trip time in an updated list of aggregate round trip times; and selecting an updated intermediate server from the list of available intermediate servers, the selected updated intermediate server being associated with the updated optimal aggregate round trip time.

16. The method of claim 15, wherein determining whether the aggregate round trip time associated with the selected intermediate server continues to be the optimal aggregate round trip time is determined based on a threshold percentage of the aggregate round trip time associated with the selected intermediate server.

17. The method of claim 10, further comprising:
monitoring the network communication channel to determine whether a front end connection between the electronic device and the selected intermediate server has degraded;
when the front end connection between the electronic device and the selected intermediate device has degraded, updating the list of available intermediate servers to exclude a previously selected intermediate server from the list of available intermediate servers;
generating an updated list of aggregate round trip times; and
selecting an updated intermediate server based on the updated list of aggregate round trip times.

18. A non-transitory processor-readable medium storing processor-readable instructions for managing a network communication channel between an electronic device and an enterprise entity, wherein the processor-readable instructions, when executed by a processor, cause the processor to:
determine a list of available intermediate servers for establishing the network communication channel between the electronic device and the enterprise entity;
generate a list of aggregate round trip times, the list of aggregate round trip times including an aggregate round trip time associated with each intermediate server in the list of available intermediate servers, wherein each aggregate round trip time includes a front end round trip time between the electronic device and an associated intermediate server and a back end round trip time between the enterprise entity and the associated intermediate server, and wherein the back end round trip time is measured by and received from a control server distinct from the electronic device and the intermediate servers in the list of available intermediate servers;
select one of the intermediate servers from the list of available intermediate servers based on the list of aggregate round trip times; and
establish the network communication channel between the electronic device and the enterprise entity using the selected intermediate server.

* * * * *